United States Patent [19]

Anderson

[11] Patent Number: 5,221,346
[45] Date of Patent: Jun. 22, 1993

[54] CARTON SEAM EDGE SEALANT APPLYING APPARATUS AND PROCESS

[76] Inventor: Nestor A. Anderson, 20 Druid Hill Dr., Parsippany, N.J. 07054

[21] Appl. No.: 761,475

[22] Filed: Sep. 18, 1991

[51] Int. Cl.⁵ ............................................. B05G 3/02
[52] U.S. Cl. .................................. 118/405; 118/410; 118/412; 427/284; 427/285
[58] Field of Search ................ 427/284, 285; 118/410, 118/412, 405

[56] References Cited

U.S. PATENT DOCUMENTS 3,081,213  3/1963  Chinn ............................ 118/405 X

FOREIGN PATENT DOCUMENTS 899170  5/1972  Canada ............................ 118/410

Primary Examiner—Michael Lusigan
Attorney, Agent, or Firm—Evelyn M. Sommer

[57] ABSTRACT

An apparatus for applying a heat responsive melt sealant to the side edge of a carton, such as a gable-top liquid carton prior to folding the carton into its tubular form. The apparatus forces the sealant to flow evenly along an edge of the carton to be sealed and confines the sealant adjacent to the edge. The apparatus has a reverse C-shaped channel through which the carton blank edge is fed and a duct opening in the bight portion of the channel through which the sealant is fed onto the carton blank edge. In the process of the invention, after the heat responsive melt sealant is applied to the interior edge of the carton blank, the latter is conveyed to a heat station where the heat responsive melt sealant is cured preparatory to final erection of the tubular carton.

5 Claims, 2 Drawing Sheets

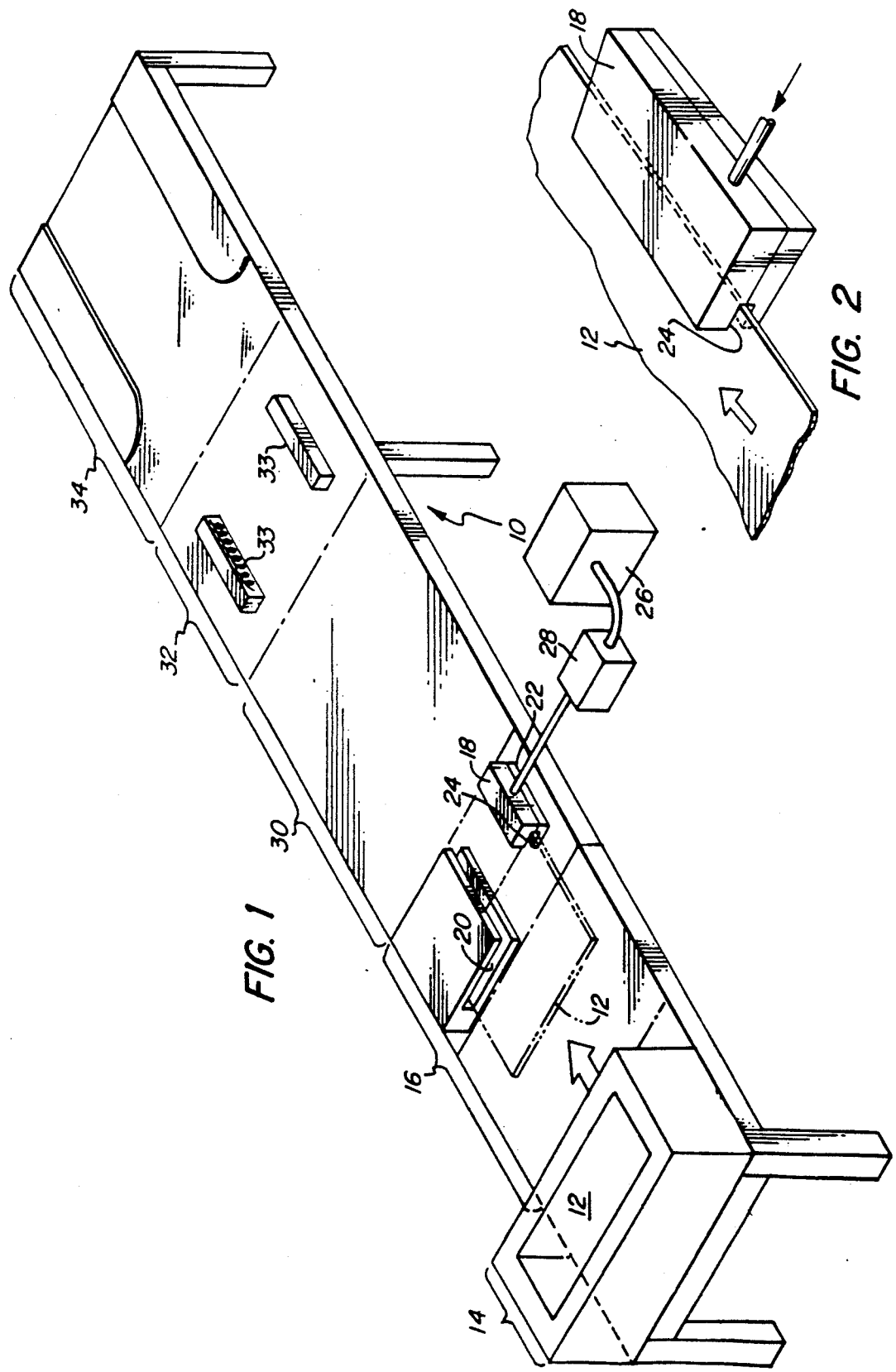

CARTON SEAM EDGE SEALANT APPLYING APPARATUS AND PROCESS

BACKGROUND OF THE INVENTION

Tubular cartons, including gable top cartons are widely employed for beverages and other liquids. A tubular carton is formed from a single blank of paperboard material with an array of score lines about which the paperboard material is folded to form the carton.

One desirable tubular carton which has a gable top is shown in U.S. Pat. No. 4,558,814 which issued to Ihde on Dec. 17, 1985, and is assigned to the assignee of the subject application. U.S. Pat. No. 4,558,814 discloses a gable top carton having first through fourth generally rectangular side panels consecutively articulated to one another, and a generally rectangular interior side edge flap articulated to the fourth panel. The interior side edge flap is sometimes referred to in the industry as the glue flap. First through fourth top and bottom flaps are articulated to the opposed ends of the first through fourth side panels, respectively, while top and bottom seam flaps are articulated to the opposed ends of the side seam flap. The blank for forming the carton disclosed in U.S. Pat. No. 4,588,814 further comprises a reinforcing tab extending from both the side seam flap and the bottom seam flap. The reinforcing tab has no score lines and is rabbeted to define a thickness less than the remainder of the blank. The unscored reinforcing tab is folded over adjacent portions of the side seam flap and the bottom seam flap to perform a reinforcing function at the bottom corner of the resulting carton.

Despite the many desirable features of tubular cartons in general, and the particular structural features shown in the above identified U.S. Pat. No. 4,558,814 (the disclosure of which is incorporated herein by reference), it has been found that in certain instances, liquids stored in a tubular carton are likely to wick into the paperboard material generally along the interior side edge thereof. The wicking could cause small amounts of liquids stored in the prior art gable top cartons to travel through the fibrous paperboard material. The wicking generally is not sufficient to cause spoilage of the product stored therein or to sufficiently reduce the volume. However, wicking of certain colored liquids, such as fruit juices, has been known to cause a clearly visible observable discoloration along the seal area of the prior art gable top carton. This discoloration is noticeable and often objectionable to consumers.

Accordingly, it is an object of the subject invention to provide an apparatus and process for sealing the interior side edge of a carton blank to prevent wicking of liquid material.

It is another object of the subject invention to provide a method and apparatus for sealing the carton side edge of a carton blank to prevent wicking of liquids through the paperboard material and into the seal areas of the carton.

It is still a further object of the subject invention to provide a new and improved apparatus and process for sealing the side edge of a gable top carton blank prior to erection of the tabular carton.

SUMMARY OF THE INVENTION

The subject invention is directed to a new and improved apparatus and process for applying a sealant to an interior side edge of a tubular carton prior to the folding and sealing of sides of the carton to each other to the erected condition of the carton. Specifically, the apparatus of the subject invention includes means for applying a heat responsive sealant to the side seam of a carton, such as a gable top liquid carton, prior to folding of the carton into its tubular form. The apparatus of the present invention forces the sealant to flow evenly along the interior edge of the carton seal flap and confines the sealant adjacent to the edge. In the process of the subject invention, carton blanks are aligned and individually conveyed to a sealant application area where the sealant is selectively applied to the exposed edge of the carton to be sealed in an even flow pattern, thereby confining the sealant adjacent to the edge. Thereafter, the carton blank is passed through a heating means for drying of the sealant, and then the carton is ready to be folded into a tubular form for forming the erected tubular carton.

The apparatus of the present invention includes a sealant applicator having first and second mating blocks, with a beveled entry chamber to guide the interior edge of the carton blank into a channel prior to folding of the carton into a tubular configuration. Sealant material is pumped through the blocks into the channel, and applied to one edge of the blank, as the blank is conveyed through the channel. The guided edge of the carton enters the sealant flow channel in the applicator via the beveled mating surfaces on the first and second blocks, and the carton edge is placed near the wall of the channel defined partially by each of the first and second blocks. The sealant material is pumped through one of the two blocks into a pair of mating cylindrical openings formed in the block structure which opens into the channel edge. The sealant is dispensed through the cylindrical openings evenly onto the carton edge as it passes through the channel adjacent the cylindrical openings. The channel confines the sealant material to a defined width along the edge of the carton. An opposite panel of the carton can be folded over the seam panel whose edge contains the sealant, and the seam panels are then subjected to heat to effect the seal.

The new and improved process of the subject invention includes the steps of conveying the gable top carton blanks in a continuous manner, thereafter selectively applying sealant to the edge of the carton to be sealed, and then applying heat to the sealant material in order to seal the carton blank preparatory to folding of the carton blank into a tubular form.

Sealing of the exposed edge of the carton blank will prevent wicking of the liquids within the erected carton, and at the same time will minimize the leakage of liquid material into an area of the paperboard material that could otherwise absorb the liquid and further encourage wicking.

BRIEF DESCRIPTION OF THE DRAWINGS

FIG. 1 is a perspective view illustrating schematically the apparatus of the subject invention;

FIG. 2 is an enlarged perspective view of the sealant applying apparatus illustrated in FIG. 1;

BRIEF DESCRIPTION OF THE INVENTION

Figure 3:
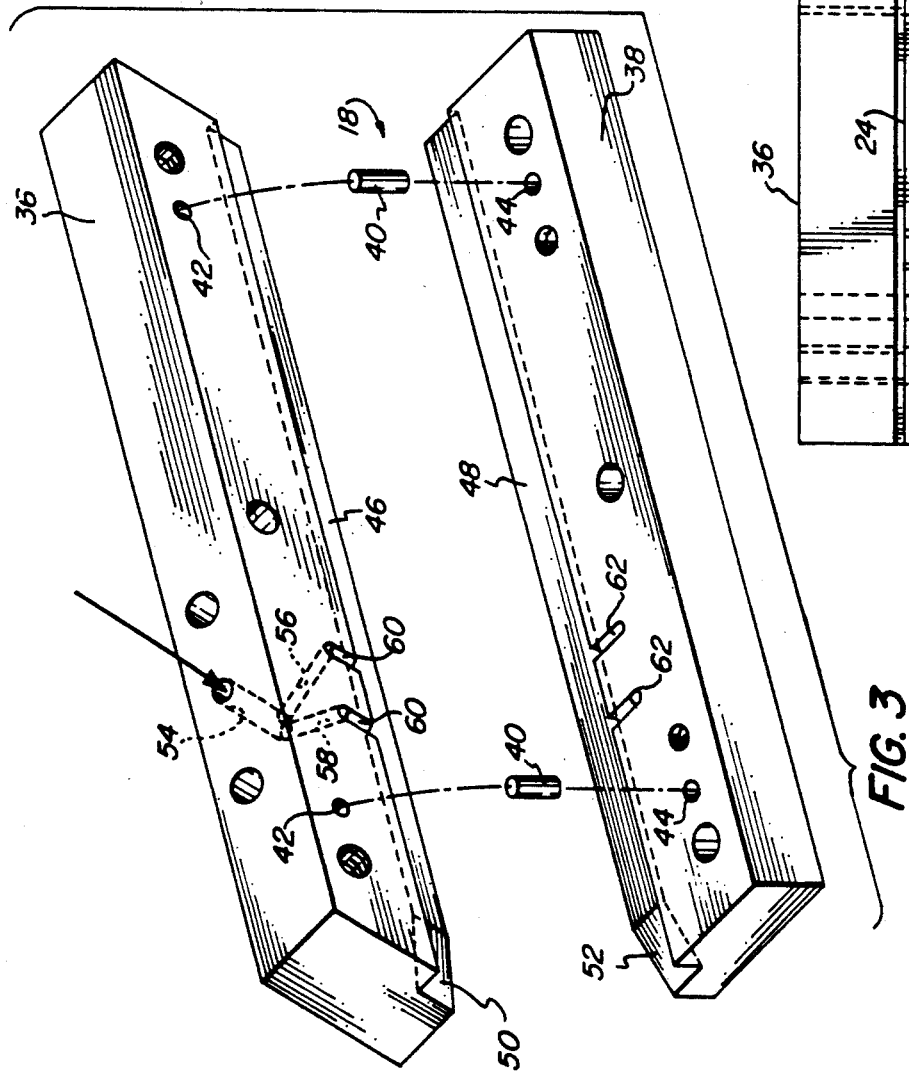
FIG. 3 is an exploded perspective view of the sealant applying apparatus of the subject invention.
Figure 4:
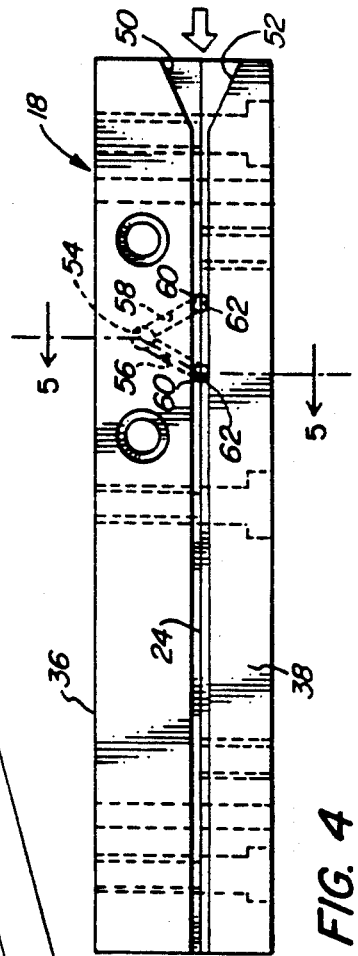
FIG. 4 is a side elevational view of the sealant applying apparatus of FIG. 3 as viewed form the left hand side of FIG. 3.

Turning to FIG. 1, the apparatus of the subject invention is generally designated by the numeral 10, and is operative to form a tubular carton such as a gable-top liquid carton formed from a prescored blank 12. A plurality of prescored blanks 12 are stacked at a feeding station 14, and individual blanks 12 are fed through a side alignment station 16 wherein a hot melt sealant is applied by an applicator 18 to one side edge of the blank 12. The opposite side edge of blank 12 is controlled by a side registration unit, designated by the numeral 20, while the opposite edge of the blank 12 is fed through a channel 24 in sealant applicator 18 that is fixed to the station 16 as at 22. The hot melt sealant is supplied by a tank 26 through a metering pump 28 disposed to the rear of the sealant applicator 18.

After the hot melt sealant is applied to one of the side edges of the blank 12, the blank 12 is conveyed to a prefold station 30 where it is folded back upon itself and then to a heat station 32 wherein the sealant and side panels are heated by burner elements 33 to adhere opposed sides of the blank together. After heating, the blank is then conveyed to the final fold station, schematically designated by the numeral 34, where it is formed into a tubular carton.

Turning to FIGS. 2–5, the applicator 18 includes top and bottom mating blocks 36 and 38, respectively, which are held in aligned relationship by pins 40, 40 received within openings 42 and 44 respectively disposed in the blocks 26 and 38. The top block 36 includes a substantially L-shaped channel 46 machined along one edge thereof, while the block 38 has a complimentary L-shaped channel 48 machined therein. When the blocks 36 and 38 are positioned one above the other, the L-shaped mating channels 46, 48 form the carton edge receiving channel 24 which is substantially reverse C-shape in cross-section and includes a bight portion 25 (see FIG. 5). Entrance to channel 24 is defined by a pair of beveled facing surfaces 50, 52 at the head of the L-shaped channels 46, 48, respectively, to guide the blank edge 12 into the channel 24.

Figure 5:
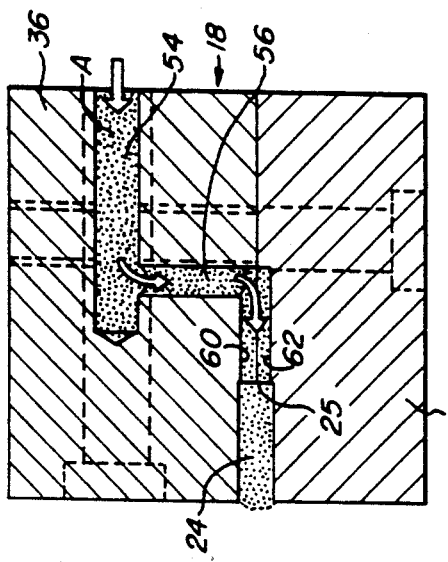
FIG. 5 is a cross-sectional view taken along the line 5—5 of FIG. 4.

As more particularly shown in FIG. 5, hot melt sealant A is forced by the metering pump 28 from tank 26 into the cylindrical duct 54 formed in the top block 36. Channel 54 has a pair of divergent ducts 56, 58 (see FIGS. 3 and 4) in communication therewith, and each of said ducts 56, 58 leads to a duct defined by semi-circular shaped duct 60 in the bottom surface of the top block 36, and aligned semi-circular ducts 62 provided in the upper surface of other block 38. As shown in FIG. 5, when the blocks 36 and 38 are secured to each other, the ducts 60, 62 form substantially cylindrical ducts opening into the side of the carton edge receiving channel 24.

During operation of the apparatus of the subject invention, as a side edge of a blank 12 traverses the channel 24, sealant A is pumped through ducts 54, 56, 58, 60 and 62, and applied evenly onto the side edge of the blank as it passes through the channel 24. The width of the channel 24 serves to confine the sealant A to a defined area on the side edge of the blank 12 passing therethrough. The blocks 36 and 38 are bolted to suitable supports at the location 22 (see FIG. 1) in the conveyor structure shown in order to hold the applicator blocks in position. Subsequently, the blank 12 is conveyed to the heat station 32 wherein the sealant and side panels of the blank are heated by burner elements 33 preparatory to being erected into a tubular carton.

Accordingly, there is provided a new and improved apparatus and process for applying sealant in a uniform manner to the interior side edge of a tubular carton, thereby inhibiting wicking of fluid through the interior side edge of the resulting erected tubular carton.

I claim:

1. Apparatus for applying a sealant to a side edge of a blank for a tubular carton said apparatus comprising:
   upper and lower blocks each having channel portions which combine to form a channel when the blocks are seated one above the other, said channel having a beveled entry port defined by divergent surfaces on the upper and lower blocks for receiving and guiding the side edge of said carton blank as it is fed through said channel, and wherein said blocks include duct means in communication with the bight portion of said channel; and
   heat activatable sealant supply means connected to said duct means for dispensing a metered amount of heat activatable sealant into said channel for coating the side edge of the carton blank as it passes through said channel.

2. The apparatus of claim 1 including pins inserted between said first and second blocks to maintain said blocks in alignment.

3. The apparatus of claim 1 wherein said duct means comprises said first and second blocks having a pair of spaced and aligned ducts on facing surfaces thereof to receive the sealant material, said ducts opening in the bight portion of said channel.

4. The apparatus of claim 3 wherein said sealant supply means includes pump means in communication with said ducts for forcing a metered amount of sealant through said ducts as the carton blank side edge passes through said channel.

5. The apparatus of claim 4 further including pins inserted between said first and second blocks to maintain said blocks in alignment.

* * * * *